July 22, 1924.

M. O. REHFUSS

CHAIN LINK

Filed June 18, 1921

1,502,526

Inventor—
Martin O. Rehfuss.
by his Attorneys
Howson & Howson

Patented July 22, 1924.

1,502,526

UNITED STATES PATENT OFFICE.

MARTIN O. REHFUSS, OF PHILADELPHIA, PENNSYLVANIA, ASSIGNOR TO UNITED STATES CHAIN AND FORGING COMPANY, OF PITTSBURGH, PENNSYLVANIA, A CORPORATION OF PENNSYLVANIA.

CHAIN LINK.

Application filed June 18, 1921. Serial No. 478,561.

*To all whom it may concern:*

Be it known that I, MARTIN O. REHFUSS, a citizen of the United States, residing in Philadelphia, Pennsylvania, have invented Chain Links, of which the following is a specification.

One object of my invention is to provide a novel form of chain link of wire, rod or bar material, whose parts shall be so arranged that there shall be no exposed ends or rough edges.

It is further desired to provide a link which shall have the free ends of the bar of which it is made abutted or brought immediately adjacent each other outside of its body so that the space within the latter may be left clear, for the reception of the teeth of a sprocket wheel or the like, the construction being such that the ends may be welded together.

These objects and other advantageous ends I attain as hereinafter set forth, reference being had to the accompanying drawings, in which, Fig. 1 is a perspective view of a chain link constructed in accordance with my invention;

In constructing links made in accordance with this invention, a length of bar, wire or rod material is bent around a suitable form or post so that it has a more or less elongated body with an end portion 1 and two similar side portions 2 bent toward each other at points distant from said end so as to enclose a definite and in the present instance elongated space 3.

Figure 1:
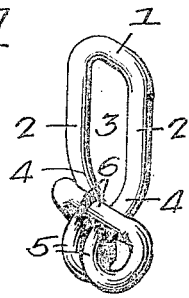
Figure 2:
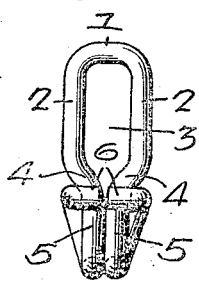
Figs. 2, 3 and 4 are respectively front, side and rear elevations of the link shown in Fig. 1.
Figure 3:
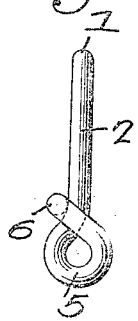
Figure 4:
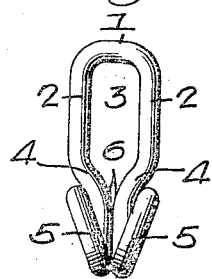
Figure 5:
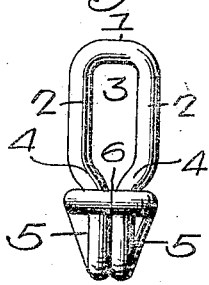
Fig. 5 is an elevation of a slightly modified form of link in which the ends of the material of which it is made have their faces in engagement.

Beyond the inclined portions 4 constituting the second end of the body, each end of the rod of which the link is formed is bent in the form of a helical or circular convolution and the two extremities of the said rod are then bent toward each other respectively across said convolutions at the front of the link, and their end faces which are preferably flat and parallel, are either brought immediately adjacent each other as shown in Fig. 2, or are abutted so that they are in engagement as shown in Fig. 5. If desired these abutting extremities may be welded together in which case the link would have the appearance illustrated in Fig. 5, usually without the transverse line therein, otherwise indicative of the extremities 6.

Figure 6:
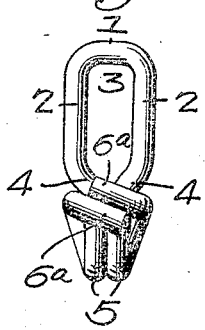
Figs. 6 and 7 are elevations of modified forms of my invention.

The two convolutions or coils 5 thus formed are substantially parallel and preferably engage each other in an axial plane of the link, defining a transverse passage or opening slightly greater in diameter than and capable of receiving, the end portion 1 of a similar link. The extremities 6 preferably extend in the same straight line at right angles to the axial line of the link, although without departing from my invention they may be slightly extended and lie parallel to each other as indicated at 6ª in Fig. 6.

Figure 7:
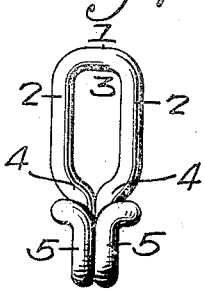

Again, as shown in Fig. 7, the two coils 5 may be flat and of annular form, and as before they lie parallel and practically in engagement with each other. Their extremities are bent forward and then across the link toward each other so as to abut or overlap as previously described.

In any case it will be noted that the opening 3 defined by the body is unobstructed since the extremities of the rod of which the link is made are altogether outside of it. Moreover said extremities, particularly when welded together, form a particularly strong construction and do not project in such manner as to catch on anything or they present sharp edges which might cut or injure any body over which they pass.

I claim:

1. A chain link consisting of a rod bent to form an open body and coils lying adjacent each other at one end of said body, the ends of the rod being respectively bent over the coils on one side of the body and terminating adjacent each other outside of the body on the same side thereof as that over which they are bent.

2. A chain link consisting of a rod bent to form an open body and coils lying adjacent each other at one end of said body, the ends of the rod being respectively bent over the coils and abutted outside the body.

3. A chain link consisting of a rod bent to form an open body and coils lying adjacent each other at one end of said body, the ends of the rod being respectively bent over the coils and welded outside the body.

4. A chain link consisting of a rod bent to form an open body and two substantially circular convolutions lying in planes substantially at right angles to that of the body, the extremities of said convolutions having 90° bends beyond the coils and lying immediately adjacent each other outside of the body.

5. A chain link consisting of a rod bent to form an open body and two convolutions lying in planes substantially at right angles to that of said body, the ends of the rod being bent across the convolutions in the same straight line.

6. A chain link consisting of a rod bent to form an open elongated body and two convolutions at one end of said body, the ends of said convolutions being bent through angles of 90° toward and terminating immediately adjacent each other.

MARTIN O. REHFUSS.